US008819408B2

(12) United States Patent
Chiueh et al.

(10) Patent No.: US 8,819,408 B2
(45) Date of Patent: Aug. 26, 2014

(54) DOCUMENT PROCESSING METHOD AND SYSTEM

(75) Inventors: Tzi-Cker Chiueh, Taipei (TW); Dilip Simha, East Setauket, NY (US)

(73) Assignee: Industrial Technology Research Institute, Hsinchu (TW)

( * ) Notice: Subject to any disclaimer, the term of this patent is extended or adjusted under 35 U.S.C. 154(b) by 77 days.

(21) Appl. No.: 13/454,103

(22) Filed: Apr. 24, 2012

(65) Prior Publication Data

US 2013/0159695 A1 Jun. 20, 2013

Related U.S. Application Data

(63) Continuation-in-part of application No. 13/330,721, filed on Dec. 20, 2011.

(30) Foreign Application Priority Data

Feb. 10, 2012 (TW) .................................. 101104417

(51) Int. Cl.
*H04L 9/00* (2006.01)
*G06F 15/16* (2006.01)

(52) U.S. Cl.
USPC ........................................................ 713/150

(58) Field of Classification Search
USPC ........................................................ 713/150
See application file for complete search history.

(56) References Cited

U.S. PATENT DOCUMENTS

| 7,181,017 | B1 * | 2/2007 | Nagel et al. ................... 380/282 |
| 7,412,535 | B2 * | 8/2008 | Agarwalla et al. ............ 709/236 |
| 7,426,534 | B2 * | 9/2008 | Challenger et al. ........... 709/203 |
| 7,751,565 | B2 * | 7/2010 | Yuen .............................. 380/255 |
| 7,869,591 | B1 * | 1/2011 | Nagel et al. ..................... 380/28 |
| 7,957,535 | B2 | 6/2011 | Ochi et al. |
| 8,046,365 | B2 * | 10/2011 | Saito .............................. 707/741 |
| 8,060,394 | B2 * | 11/2011 | Woodings et al. ........... 705/7.13 |
| 8,218,166 | B2 * | 7/2012 | Saito ............................ 358/1.14 |

(Continued)

FOREIGN PATENT DOCUMENTS

CN 1347049 5/2002

OTHER PUBLICATIONS

Chang et al., Privacy Preserving Keyword Searches on Remote Encrypted Data, Springer-Verlag Berlin Heidelberg 2005, pp. 442-455.*

(Continued)

*Primary Examiner* — Azizul Choudhury
*Assistant Examiner* — Tariq Najee-Ullah
(74) *Attorney, Agent, or Firm* — Jianq Chyun IP Office (57) ABSTRACT

A document processing method and system divides a document into document pages, and encrypts the document pages by first key to obtain a plurality of encrypted pages; picks a part of words from the document pages and encrypts them by second key to obtain a Significant Word Set (SWS); picks a part of words from the picked part of words and encrypts them by third key to obtain a Most Relevant Word Set (MRWS). The encrypted pages, the SWS and the MRWS are transmits to a remote server for storage. When user search a keyword in the document, the keyword is encrypted by the second and third keys for performing two query. The first query result is decrypted to obtain the search result. The second query result is decrypted and then checked whether it is a subset of the first decrypted query result for detecting unfaithful execution.

19 Claims, 5 Drawing Sheets

(56) References Cited

U.S. PATENT DOCUMENTS

| | | | |
|---|---|---|---|
| 8,316,237 | B1 | 11/2012 | Felsher et al. |
| 8,595,508 | B2* | 11/2013 | Yuen ............................. 713/185 |
| 8,660,876 | B2* | 2/2014 | Woodings et al. ........... 705/7.13 |
| 2002/0010798 | A1* | 1/2002 | Ben-Shaul et al. ........... 709/247 |
| 2002/0091836 | A1* | 7/2002 | Moetteli ....................... 709/227 |
| 2003/0055831 | A1* | 3/2003 | Ryan et al. ................... 707/100 |
| 2004/0101142 | A1* | 5/2004 | Nasypny ....................... 380/278 |
| 2006/0167860 | A1* | 7/2006 | Eliashberg et al. ................ 707/3 |
| 2007/0180356 | A1* | 8/2007 | Sun ............................... 715/511 |
| 2008/0133935 | A1* | 6/2008 | Elovici et al. ................ 713/193 |
| 2010/0146299 | A1* | 6/2010 | Swaminathan et al. ...... 713/189 |
| 2011/0110525 | A1 | 5/2011 | Gentry |
| 2011/0145594 | A1* | 6/2011 | Jho et al. ....................... 713/189 |
| 2012/0260108 | A1* | 10/2012 | Lee ............................... 713/191 |

OTHER PUBLICATIONS

Golle et al., Secure Conjunctive Keyword Search over Encrypted Data, Springer-Verlag Berlin Heidelberg 2004, pp. 31-45.*

"Office Action of Co-pending U.S. Appl. No. 13/330,721", issued on Jul. 5, 2013, p. 1-p.17.

van Dijk et al, "Fully Homomorphic Encryption over the Integers", Eurocrypt 2010, Lecture Notes in Computer Science, 2010, vol. 6110/2010, 2010, pp. 24-43.

Gentry, "Computing Arbitrary Functions of Encrypted Data", Communications of the ACM, vol. 53 Issue 3, Mar. 2010, pp. 97-104.

Gentry et al., "Implementing Gentry's Fully-Homomorphic Encryption Scheme—Preliminary Report", EUROCRYPT11 Proceedings of the 30th Annual international conference on Theory and applications of cryptographic techniques: advances in cryptology, Aug. 5, 2010, pp. 1-30.

Gentry, "A Fully Homomorphic Encryption Scheme", A Dissertation Submitted to the Department of Computer Science and the Committee on Graduate Studies of Stanford University in Partial Fulfillment of the Requirements for the Degree of Doctor of Philosophy, Sep. 2009.

Rivest et al, "Data Banks and Privacy Homomorphisms", Foundations of Secure Computation (1978), 1978, pp. 169-180.

Smart et al, "Fully Homomorphic SIMD Operations", in IACR Cryptology ePrint Archive, vol. 2011, Mar. 2011, Total 19 pages.

"Office Action of Taiwan Counterpart Application", issued on Jun. 12, 2014, pp. 1-10, in which the listed reference was cited.

* cited by examiner

DOCUMENT PROCESSING METHOD AND SYSTEM

CROSS-REFERENCE TO RELATED APPLICATION

This application is a continuation-in-part application of and claims the priority benefit of a prior application Ser. No. 13/330,721, filed on Dec. 20, 2011. This application also claims the priority benefit of Taiwan patent application serial no. 101104417, filed on Feb. 10, 2012. The entirety of each of the above-mentioned patent applications is hereby incorporated by reference herein and made a part of this specification.

BACKGROUND OF THE DISCLOSURE

1. Technical Field

The disclosure relates to an electronic system. Particularly, the disclosure relates to a document processing method for storing a document to a remote server and a document processing system.

2. Related Art

In today's information age, storage and processing of documents are important issues. Along with popularity of communication technology, the user probably wants to access, search or process a same document at different places and different time. By using a remote storage technique, a local client can store a plurality of documents in a remote storage server (RSS) through a communication network. For example, a cloud server can satisfy humungous data storage requirements of multiple clients.

Considering information security, the documents stored in the remote server have to be encrypted. In order to satisfy a data processing demand (for example, keyword searching, etc.) of the client, the remote server in a conventional document processing system has to have a decryption capability. For example, the conventional remote server has to have a decryption key to convert an encrypted document into a plaintext, and then search the plaintext for the keyword. However, the remote server is probably not reliable. In case that the remote server has the decryption capability, the client cannot prevent an unfaithful query processing of the remote server. Namely, the document stored in the remote server can be peeked/leaked.

In another conventional document processing system, the remote server does not have the decryption capability, so that the client has to completely download each of the documents of a plurality of the encrypted documents, and then uses a key to decrypt the encrypted documents, so as to perform data processing (for example, keyword searching, etc.). Therefore, in case of the humungous data storage requirements, the humungous encrypted documents consume a large amount of bandwidth resources.

SUMMARY

The disclosure is directed to a document processing method and a document processing system, which improve information security of remote storage documents, and facilitate a remote server to deal with various data processing requirements.

The disclosure provides a document processing method, which is described as follows. A client divides at least one document into a plurality of document pages, and individually encrypts the document pages by a first key to obtain a plurality of encrypted pages. The client extracts a part of words from the document pages to obtain a plurality of significant words. The client records the significant words and page information of the significant words. The client individually encrypts the significant words and the page information by a second key different to the first key to obtain an encrypted second document. The client transmits the encrypted pages and the encrypted second document to a remote server for storage.

The disclosure provides a document processing system including a remote server and a client. The client is connected to the remote server through a communication network. The client divides at least one document into a plurality of document pages, and individually encrypts the document pages by a first key to obtain a plurality of encrypted pages. Then, the client extracts a part of words from the document pages to obtain a plurality of significant words, and records the significant words and page information of the significant words. The client individually encrypts the significant words and the page information by a second key different to the first key to obtain an encrypted second document. The client transmits the encrypted pages and the encrypted second document to a remote server for storage.

According to the above descriptions, in the disclosure, the client respectively encrypts the document pages and the second document by using different keys, and then transmits the encrypted pages and encrypted second document to the remote server for storage. Since the remote server does not have the keys, the remote server cannot decrypt the document pages and the second document. Moreover, since the keys used for encrypting the document pages and the second document are different, information security of the document stored in the remote server is enhanced. In addition, as the client extracts the encrypted significant words of the document pages in advance to produce the second document, the remote server can perform corresponding processing in an encryption-domain according to various processing requirements (for example, keyword searching, etc.) of the client.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
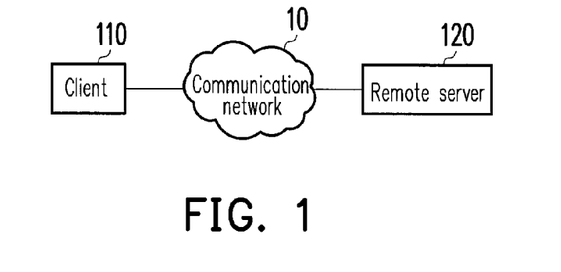
FIG. 1 is a functional block schematic diagram of a document processing system according to an embodiment of the disclosure.

FIG. 1 is a functional block schematic diagram of a document processing system according to an embodiment of the disclosure. The document processing system includes a remote server 120 and a client 110. The remote server 120 can be a remote storage server (RSS), a cloud server or other types of servers. The client 110 can be a personal computer (PC), a notebook computer, a personal digital assistant (PDA), a smart phone or other types of programmable devices. The client 110 is connected to the remote server 120 through a communication network 10.

Figure 2:
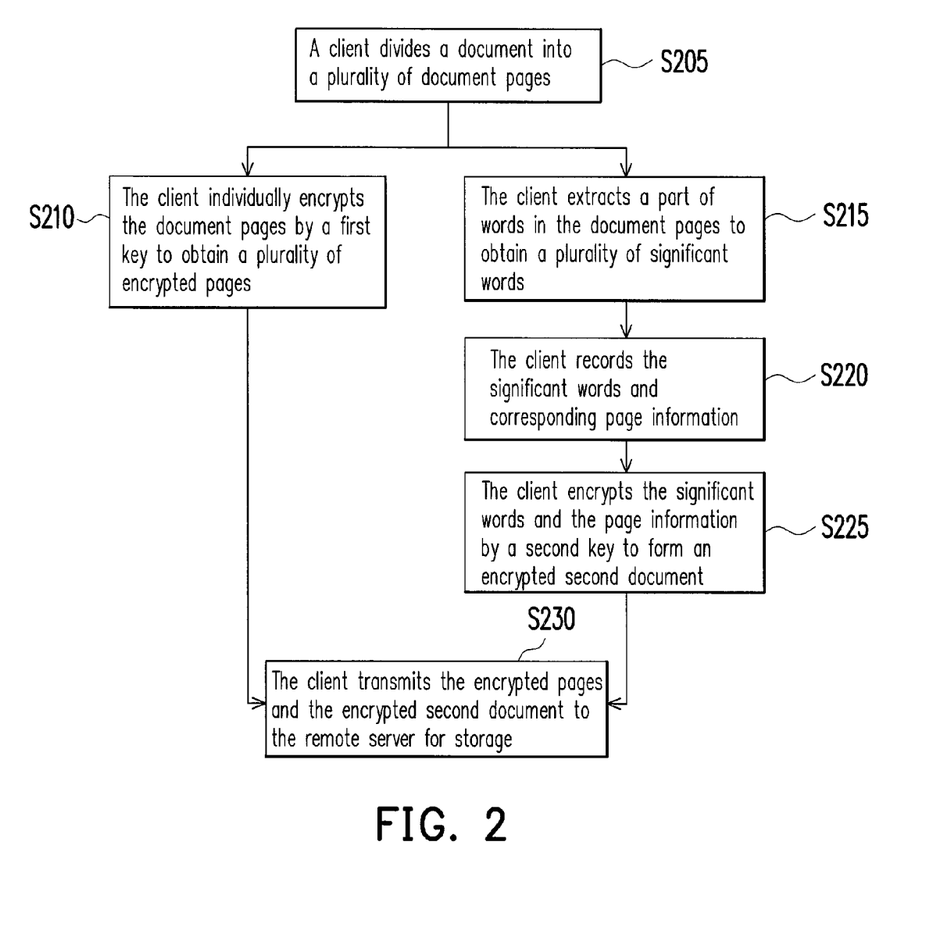
FIG. 2 is a flowchart illustrating a document processing method according to an embodiment of the disclosure.

FIG. 2 is a flowchart illustrating a document processing method according to an embodiment of the disclosure. Referring to FIG. 1 and FIG. 2, before the client 110 transmits one or a plurality of text documents to the remote server 120 through the communication network 10 for storage, the client 110 performs the steps shown in FIG. 2. In sep S205, the client 110 divides each of the documents into a plurality of document pages. For example, the client 110 breaks a document into a plurality of pages, and each of the pages has a size of 128 KB. Then, in step S210, the client 110 individually encrypts the document pages by a first key CPS-KEY to obtain a plurality of encrypted pages. The encrypted pages are respectively assigned with a unique identification (ID). In the present embodiment, the client 110 individually compresses the document pages to obtain a plurality of compressed pages, and individually encrypts the compressed pages by the first key CPS-KEY to obtain the encrypted pages. In other embodiments, in the step S210, the client 110 probably does not compress the document pages, instead, the client 110 may directly encrypt the document pages by the first key CPS-KEY to obtain the encrypted pages. The encrypted and compressed pages are one-by-one arranged in a huge file, which is referred to as a compressed page sequence (CPS). Then, the client 110 transmits the encrypted pages (the CPS) to the remote server 120 for storage (step S230).

Moreover, after the step S205, the client 110 further executes a step S215. In the step S215, the client 110 extracts a part of words from the document pages that are still not encrypted to obtain a plurality of significant words, and uses the significant words to form a significant word set (SWS). Namely, the client 110 identifies a plurality of meaningful words in the document pages. In some embodiments, in the step S215, the client 110 can remove articles (for example, "a", "an" and "the", etc.) and other basic grammar words (for example, "to", "for" and "with", etc.) from the document pages to obtain the significant words. In some other embodiments, in the step S215, after the client 110 removes the articles and the basic grammar words from the document pages to obtain a plurality of original words, the client 110 further performs stemming on the original words to obtain the significant words. The stemming is to convert a single word into a root according to a Porter algorithm or other algorithms, for example, convert the words "retrieve", "retrieval" and "retrieving", etc. into a same root "retriev", and for another example, convert the words "have", "having" and "had", etc. into a same root "hav".

Therefore, according to the step S215, regarding a document with 10000 words, about 500 significant words can be extracted there from. After the step S215 is completed, a step S220 is executed, by which the client 110 records the SWS formed by a plurality of the significant words and page information of the significant words, and in step S225, the client 110 individually encrypts the significant words and the page information by a second key SWS-KEY to obtain an encrypted second document. The first key CPS-KEY and the second key SWS-KEY are two different keys.

In some embodiments, the page information (index information) may include a file name of the document and a page offset in the document. For example, a document with a file name of AA is divided into 5 pages, and a significant word "home" is extracted from a third page of the document AA (i.e. a third page of the encrypted pages), so that the page information of the significant word "home" includes "AA, 3".

After the step S225 is completed, a step S230 is executed, by which the client 110 transmits the encrypted pages and the encrypted second document (an index of the original document) to the remote server 120 for storage. The remote server 120 stores the encrypted pages into a database after receiving the encrypted pages. After the remote server 120 receives the encrypted second document, the remote server 120 logs/joins each of the encrypted significant words and the corresponding page information in the encrypted second document to a global search index (GSI) of the remote server 120. For example, the GSI includes a key field and a value field, where the key field records the encrypted significant words, and the value field records the page information (the index information). The GSI is implemented by using some standard open source utilities (for example, Lucene of Apache). Each of the encrypted significant words in the GSI is mapped to the corresponding index information, and the remote server 120 can find the corresponding encrypted page from the database according to the index information.

Figure 3:
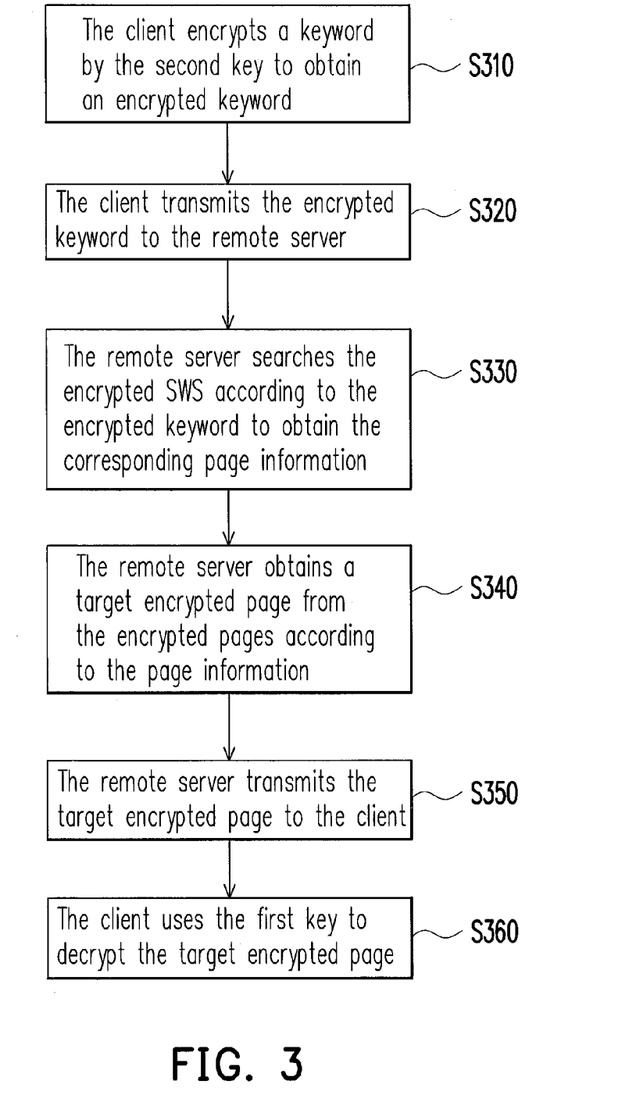
FIG. 3 is a flowchart that a remote server processes a search request of a client according to an embodiment of the disclosure.

FIG. 3 is a flowchart that the remote server 120 processes a search request of the client 110 according to an embodiment of the disclosure. When the client 110 is to search a certain keyword KW, in step S310, the client 110 encrypts the keyword KW by the second key SWS-KEY to obtain an encrypted keyword. Then, the client 110 transmits the encrypted keyword to the remote server 120 (step S320). The remote server 120 searches the GSI according to the encrypted keyword to obtain all of the encrypted second documents containing the encrypted keyword and transmits the encrypted second documents to the client. The client decrypts the encrypted second documents by the second key SWS-KEY to obtain the page information (the index information) corresponding to the encrypted keyword (step S330), and requests the remote server 120 to obtain the encrypted pages corresponding to the page information. The remote server 120 obtains at least one target encrypted page from the encrypted pages stored in the database (step S340). Then, the remote server 120 transmits the target encrypted page to the client 110 (step S350). It should be noticed that in the step S350, the remote server 120 transmits a part of the encrypted pages of the text document to the client 110 without transmitting all of the encrypted pages of the text document to the client 110.

After the client 110 receives the target encrypted page from the remote server 120, the client 110 uses the first key CPS-KEY to decrypt the target encrypted page (step S360). In some embodiments, if the document pages are first compressed and then encrypted in the step S210 of FIG. 2, in the step S360 of FIG. 3, the client 110 first decrypts the target encrypted page and then performs decompression to convert the target encrypted page into a plaintext document page. After the plaintext document page is obtained, the client 110 performs data processing (for example, a detailed search) of a subsequent stage.

According to the above descriptions, the client 110 uses different keys CPS-KEY and SWS-KEY to respectively encrypt the document pages and the second document (the SWS and the index information), and then transmits the encrypted document pages and the encrypted second document to the remote server 120 for storage. Since the remote server 120 does not have the keys CPS-KEY and SWS-KEY, the remote server 120 cannot decrypt the encrypted document pages and the encrypted second document. Moreover, since the key CPS-KEY used for encrypting the document pages and the key SWS-KEY used for encrypting the second document are different, information security of the document stored in the remote server 120 is enhanced.

In addition, as the client 110 extracts the encrypted significant words of the document pages with a large data amount to produce the encrypted second document with a small data amount in advance, the remote server 120 can perform corresponding processing on the encrypted second document with the small data amount in an encryption-domain according to various processing requirements (for example, keyword searching, etc.) of the client 110 without searching the encrypted pages with a huge data amount from the database. Therefore, the operation efficiency of the remote server 120 can be effectively improved. Moreover, the remote server 120 transmits back a part of the encrypted pages of the text document to the client 110 other than transmits back the entire encrypted text document (or all of the encrypted pages) to the client 110, so that a bandwidth resource of the communication network can be effectively saved.

Figure 4:
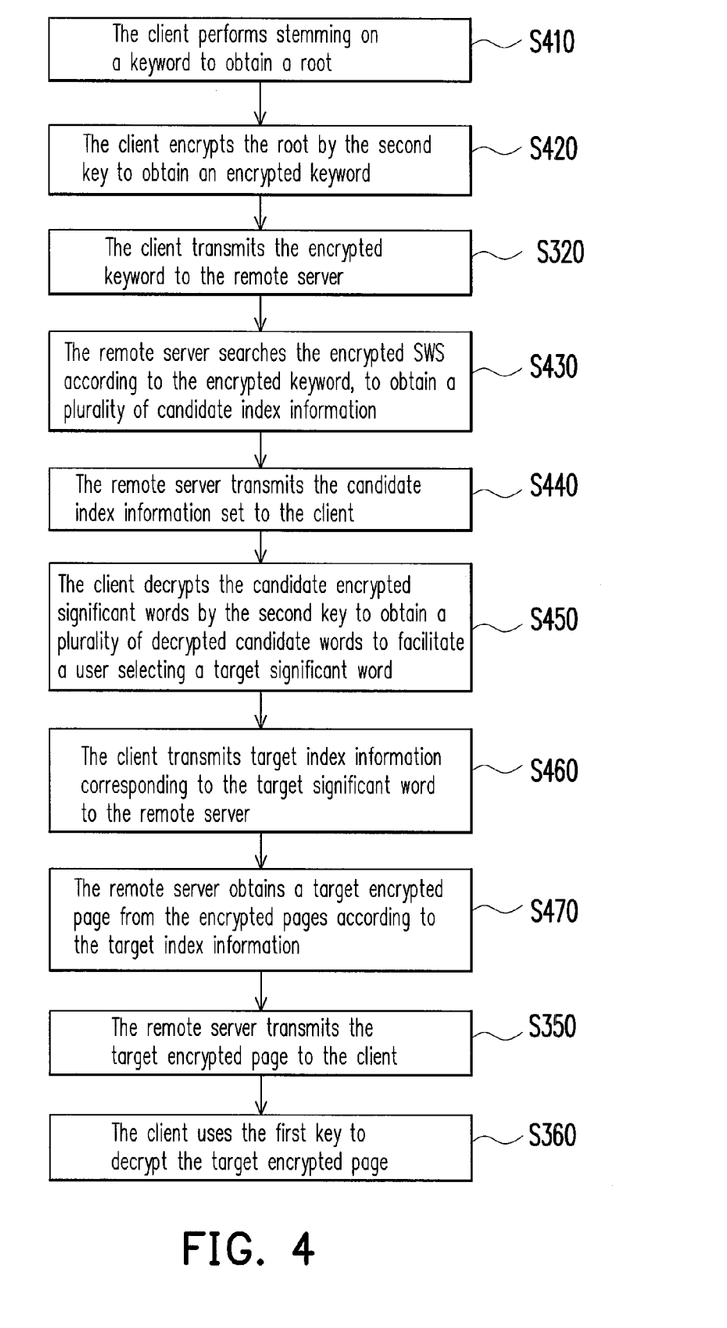
FIG. 4 is a flowchart that a remote server processes a search request of a client according to another embodiment of the disclosure.

FIG. 4 is a flowchart that the remote server 120 processes a search request of the client 110 according to another embodiment of the disclosure. Related descriptions of the embodiment of FIG. 3 can be referred for descriptions of the embodiment of FIG. 4. In some embodiments, when the client 110 is to search a keyword KW, if the stemming is performed in the step S215 of FIG. 2, a step S410 of FIG. 4 is required to be performed, by which the client 110 performs stemming on the keyword KW to obtain a root thereof. After the root of the keyword KW is obtained, the client 110 encrypts the root by the second key SWS-KEY to obtain an encrypted keyword (step S420). Then, the client 110 transmits the encrypted keyword to the remote server 120 (step S320).

After the remote server 120 obtains the encrypted keyword, the remote server 120 searches the encrypted second document according to the encrypted keyword, i.e. searches the GSI to obtain a plurality of candidate index information corresponding to the encrypted keyword (step S430). The candidate index information corresponding to the encrypted keyword forms an index information set, where the index information set includes a plurality of candidate encrypted significant words and a plurality of the candidate index information. The remote server 120 transmits the candidate index information set to the client 110 (step S440).

In some embodiments, the remote server 120 counts occurring times of the encrypted keyword transmitted to the remote server 120 from the client 110 or other clients. Therefore, in step S440, the remote server 120 ranks the index information set according to a most frequently occurring keyword in the encrypted second document of the remote server 120, i.e. according to a searching frequency or times of the keyword in the SWS (the GSI), and transmits the ranked index information set to the client 110.

The client 110 decrypts the candidate encrypted significant words of the candidate index information set by the second key SWS-KEY to obtain a plurality of decrypted candidate words (step S450), and the user can select a target significant word from the decrypted candidate words. After the user selects the target significant word, the client 110 transmits target index information corresponding to the target significant word in the candidate index information to the remote server 120 (step S460).

According to the target index information transmitted from the client 110, the remote server 120 obtains a corresponding target encrypted page from the encrypted pages stored in the database (step S470), and then transmits the target encrypted page to the client 110 (step S350). The client 110 decrypts the target encrypted page by the first key CPS-KEY (step S360).

Figure 5:
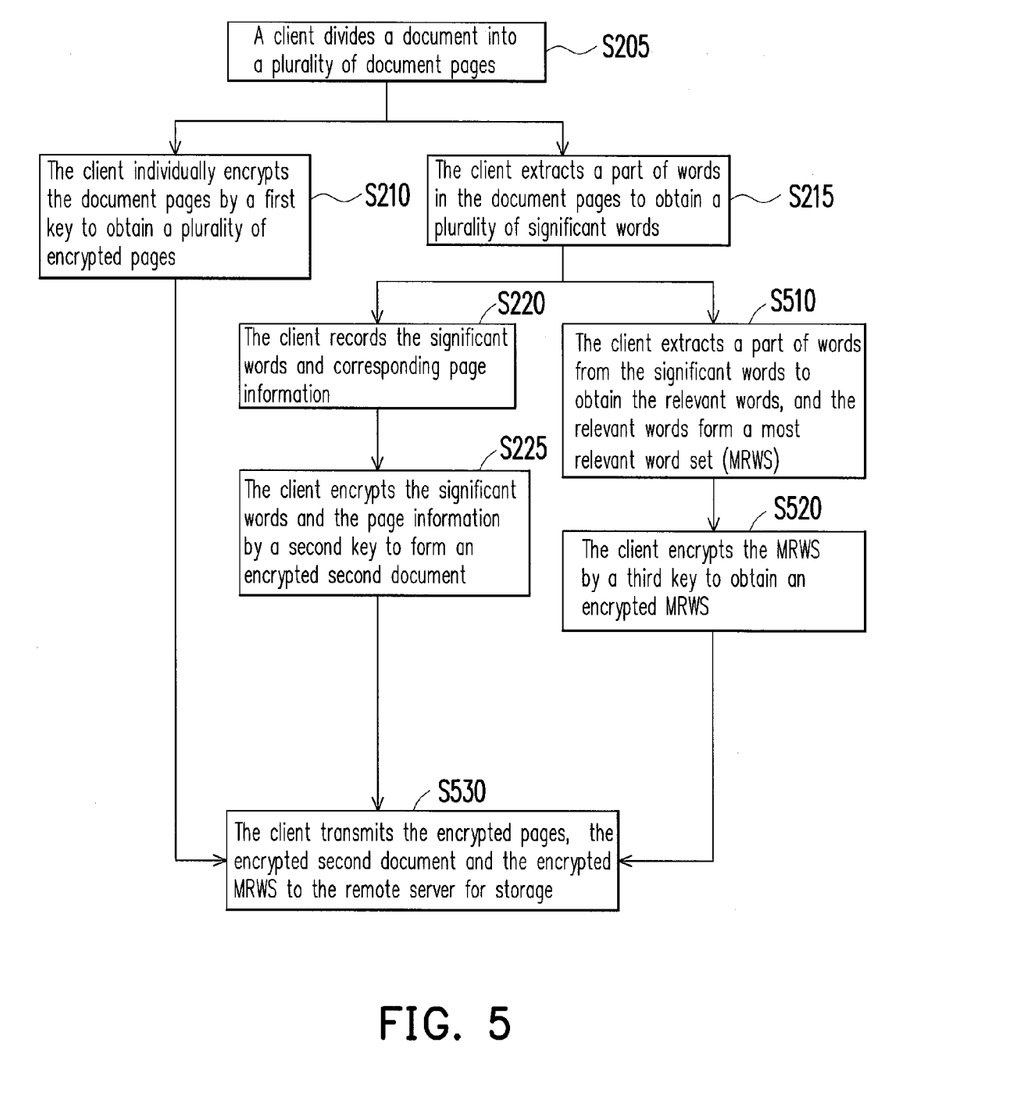
FIG. 5 is a flowchart illustrating a document processing method according to another embodiment of the disclosure.

FIG. 5 is a flowchart illustrating a document processing method according to another embodiment of the disclosure. Descriptions of the embodiment of FIG. 5 can referred to related descriptions of the embodiment of FIG. 2, and different to the embodiment of FIG. 2, the embodiment of FIG. 5 further includes steps S510-S540. Referring to FIG. 1 and FIG. 5, after the step S215, the client 110 executes the step S510. In the step S510, the client 110 extracts a part of words from the significant words of the step S215 to obtain a plurality of relevant words. For example, in the step S510, a commonly used word set is defined, and words belonged to the commonly used word set are extracted from the significant words to obtain the relevant words, and the relevant words form a most relevant word set (MRWS). In some embodiments, the client 110 selects representative samples from the significant words of the step S215, and these words are likely to appear in most of the queries.

In the present embodiment, the client 110 defines most repeated words of the English vocabulary as the commonly used word set, and extracts the most repeated words of the English vocabulary from the significant words of the step S215 to obtain the relevant words (step S510). For example, the English vocabulary is ranked according to commonly used degrees of the words, and the front 1% of the most repeated words are extracted to serve as the commonly used word set. Then, the client 110 extracts the words belonged to the commonly used word set from the significant words to obtain the relevant words. According to the number of words in the commonly used word set, the client 110 can control the number of the relevant words in the step S510. For example, regarding a document with 10000 words, about 500 significant words can be extracted there from according to the step S215, and 50 relevant words can be extracted from the 500 significant words according to the step S510.

Then, the client 110 individually encrypts the MRWS by a third key MRWS-KEY to obtain an encrypted MRWS (step S520), where the third key MRWS-KEY is different to the first key CPS-KEY and the second key SWS-KEY. The user can use standard open source key generation utilities to generate the first key CPS-KEY, the second key SWS-KEY and the third key MRWS-KEY. According to the key generation utilities, the client 110 can generate the three keys CPS-KEY, SWS-KEY and MRWS-KEY by using one passphrase.

After the encrypted MRWS is established, in the step S530, the client 110 transmits the encrypted pages of the step S210, the encrypted second document of the step S225 and the encrypted MRWS of the step S520 to the remote server 120 for storage. During a process of transmitting the encrypted second document (including the encrypted SWS and the page information) and the encrypted MRWS to the remote server 120, the client 110 is unnecessary to notify the remote server 120 which one is the encrypted SWS and which one is the encrypted MRWS. The remote server 120 cannot perceive which index information belongs to the encrypted SWS or the encrypted MRWS. The encrypted SWS and the encrypted MRWS are similar for the remote server 120. Therefore, when the remote server 120 responds the client 110, there is no difference between the SWS and the MRWS. Only the client 110 knows such information since the client 110 has the third key MRWS-KEY.

In other embodiments, the client 110 can further prevent the remote server 120 from obtaining any knowledge. For example, the client 110 periodically transmits a dummy encrypted MRWS to ensure that the remote server 120 cannot try to pair the contents of the encrypted SWS and the encrypted MRWS. Similarly, during a query search period, the client 110 first encrypts the keyword by the second key SWS-KEY, and then transmits the encrypted keyword for searching. Then, after a plurality of random numbers of such request is transmitted, the client 110 uses the third key MRWS-KEY for encryption, and then performs transmission for querying. Therefore, the client 110 cannot immediately confirm a subset of the search result.

After the remote server 120 receives the encrypted pages, the remote server 120 stores the encrypted pages to the database. After the remote server 120 receives the encrypted second document and the encrypted MRWS, the remote server 120 logs/joins each of the encrypted significant words and the corresponding index information in the second document to the GSI of the remote server 120, and logs/joins each of the encrypted relevant words in the encrypted MRWS to the GSI of the remote server 120. Each of the encrypted words in the GSI is mapped to a corresponding document ID, where the document ID indicates an encrypted page where a given word can be found. The document ID is combination of a file name and a page offset in the document, and the file name and the page offset are combined and encrypted. The GSI is implemented by using some standard open source utilities (for example, Lucene of Apache).

By mixingly storing the encrypted SWS and the encrypted MRWS in the GSI, most of statistical attacks can be prevented since an attacker cannot obtain information about a word usage frequency. In other embodiments, the client 110 can further insert null keywords at random points in the encrypted MRWS to assist preventing any statistical attack. In some embodiments, a part of words is extracted from the significant words and is encrypted by the third key MRWS-KEY to obtain the encrypted MRWS. The encrypted pages, the encrypted second document (including the SWS and the index information) and the encrypted MRWS are transmitted to the remote server for storage. When the client uses a keyword to search documents, two queries are sent after encrypting the keyword by the second key SWS-KEY and the third key MRWS-KEY. After a first query result is decrypted, pages containing the queried keyword in the original document are obtained. After a second query result is decrypted, it is compared whether such result is a subset of the first query result, so as to detect an unfaithful execution behavior.

Figure 6:
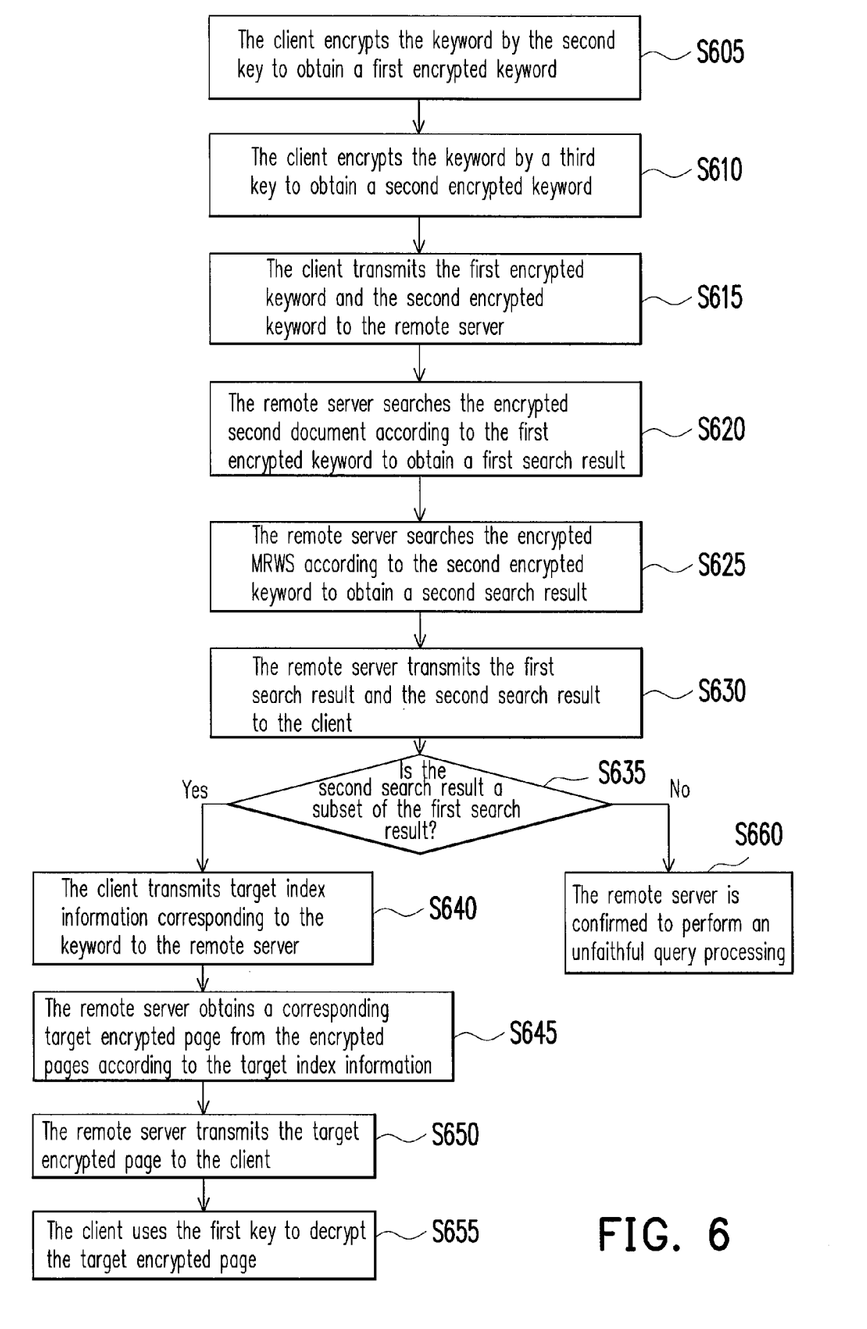
FIG. 6 is a flowchart that a remote server processes a search request of a client according to still another embodiment of the disclosure.

FIG. 6 is a flowchart that the remote server 120 processes a search request of the client 110 according to still another embodiment of the disclosure. When the client 110 is to search a certain keyword KW, in step S605, the client 110 encrypts the keyword KW by the second key SWS-KEY to obtain a first encrypted keyword, and in step S610, the client 110 encrypts the same keyword KW by the third key MRWS-KEY to obtain a second encrypted keyword. After the encryptions are completed, in step S615, the client 110 transmits the first encrypted keyword and the second encrypted keyword to the remote server 120. Since different keys SWS-KEY and MRWS-KEY are used to encrypt the same keyword KW, the remote server 120 cannot distinguish the two indexes of the encrypted SWS and the encrypted MRWS.

The remote server 120 searches the encrypted second document according to the first encrypted keyword to obtain a first search result corresponding to the first encrypted keyword (step S620). Moreover, the remote server 120 searches the encrypted MRWS according to the second encrypted keyword to obtain a second search result corresponding to the second encrypted keyword (step S625). In the embodiment that the encrypted SWS and the encrypted MRWS are mixingly stored in the GSI, the remote server 120 searches the GSI according to the first encrypted keyword to obtain the first search result, and searches the GSI according to the second encrypted keyword to obtain the second search result. Thereafter, the remote server 120 executes a step S630 to transmit the first search result and the second search result to the client 110.

Generally, the client 110 can send the search request to the remote server 120 by using a plurality of keywords, and the client 110 probably wants to know files most relevant to the keywords. The remote server 120 uses arbitrary combinations of the keywords to optimize a plurality of document IDs in the first search result. The remote server 120 further performs optimization by using a keyword based ranking system. For example, the remote server 120 can arrange the first search result according to an ascending order of the document IDs. For another embodiment, the remote server 120 can arrange the order of the document IDs in the first search result according to the number of the keywords contained in a single document. For still another embodiment, the remote server 120 can also arrange the order of the document IDs in the first search result according to referred times of the keywords. For example, the GSI has 1000 encrypted words (encrypted keywords and/or encrypted relevant words) pointed to a document A, and has 500 encrypted words (encrypted keywords and/or encrypted relevant words) pointed to a document B, the document A is then arranged before the document B in the first search result.

The remote server 120 merges a plurality of query results and transmits back a united result, and such result has been ranked according to the most frequently occurring keyword in the encrypted index of the remote server 120. Such method avails the client 110 performing quick and efficient analysis. Since the keyword KW is fundamentally encrypted, particularly, after performing the stemming and deleting the basic grammar words, the encrypted index (i.e. the encrypted second document) only has specific given words, statistical attacks can be prevented.

In other embodiments, to prevent the remote server 120 from obtaining any knowledge. During a query search period, the client 110 first encrypts the keyword by the second key SWS-KEY to obtain a first encrypted keyword, and then transmits the first encrypted keyword to the remote server 120 for searching. The remote server 120 searches the encrypted second document and the encrypted MRWS according to the first encrypted keyword to obtain the first search result corresponding to the first encrypted keyword. The remote server 120 transmits the first search result to the client 110. Then, the client encrypts the same keyword by the third key MRWS-KEY to obtain a second encrypted keyword, and then transmits the second encrypted keyword to the remote server 120 for searching. The remote server 120 searches the encrypted SWS and the encrypted MRWS according to the second encrypted keyword to obtain the second search result corresponding to the second encrypted keyword. The remote server 120 transmits the second search result to the client 110.

Then, the client 110 uses the second key SWS-KEY and the third key MRWS-KEY to decrypt the first search result and the second search result, and then compares the decrypted first search result and the second search result (step S635). Since the encrypted MRWS is a subset of the SWS, generally, the second search result is a subset of the first search result. If it is determined that the second search result is the subset of the first search result according to the step S635, a step S640 is executed, by which the client 110 transmits target index information corresponding to the keyword KW in the first search result to the remote server 120.

According to the target index information transmitted from the client 110, the remote server 120 obtains a corresponding target encrypted page from the encrypted pages stored in the database (step S645), and then transmits the target encrypted page to the client 110 (step S650). It should be noticed that the remote server 120 transmits back a part of the encrypted pages of the text document to the client 110 other than transmits back the entire encrypted text document (or all of the encrypted pages) to the client 110, so that a bandwidth resource of the communication network can be effectively saved.

When a search query requires document pages corresponding to the keyword KW, the document processing system intelligently transmits a minimum number of the required pages of the document from the remote server 120 to the local client 110. According to the received encrypted pages, the client 110 uses the first key CPS-KEY to decrypt the target encrypted page, so as to convert the target encrypted page into the plaintext document (step S655). After the client 110 decrypts and decompresses the document pages, the client 110 further performs detailed searching or data processing of a subsequent stage. In this way, the network bandwidth is optimally used.

If it is determined that the second search result is not the subset of the first search result according to the step S635, the remote server 120 is confirmed to perform an unfaithful query processing (step S660). In some embodiments, in the step S660, a suitable action is undertaken, for example, a sound/light alarm is sent, or such event is recorded in a system log file. The two search indexes of the encrypted SWS and the encrypted MRWS are used to confirm the unfaithful query processed by the data storage server (i.e. the remote server 120). When the same keyword is used to simultaneously search the encrypted SWS and the encrypted MRWS, if the keyword can be found in the encrypted MRWS and cannot be found in the encrypted SWS, the remote server 120 is confirmed to perform the unfaithful query processing.

However, return contents of the encrypted second document and the encrypted MRWS are probably all 0. A null set returned by the encrypted MRWS is substantially a subset of a null set returned by the SWS, so that even if the remote server 120 has an unfaithful operation, the client 110 is unable to discover. In order to resolve such problem, the client 110 may perform following operations. The client 110 establishes a test file having a plurality of known keywords, and stores the test file into a storage device (for example, a hard disk). The aforementioned steps S205, S210, S215, S220, S225, S510 and S520 of FIG. 5 are performed to process the test file and a plurality of other documents to obtain the encrypted second document and the encrypted MRWS. Then, the encrypted second document and the encrypted MRWS are transmitted to the remote server 120 (i.e. the step S530 of FIG. 5). Thereafter, the client 110 uses some keywords (including the known keywords of the test file) for querying. Obviously, a search result of the SWS and the MRWS should contain the known keywords. If a return content of the remote server 120 is 0 (null set), the client 110 can easily determine that the remote server 120 performs an unfaithful operation.

Since three different keys CPS-KEY, SWS-KEY and MRWS-KEY are used to encrypt the same keyword, the document processing system is more robust. Even if the remote server 120 learns a scheme of the whole document processing system, the remote server 120 still cannot analyse the encrypt pages in the database and the encrypted second document (encrypted SWS) and the encrypted MRWS in the GSI. The encrypted page, the encrypted second document and the encrypted MRWS appear to be completely different since they are respectively encrypted by using different keys. Therefore, unless the remote server 120 has the three keys CPS-KEY, SWS-KEY and MRWS-KEY, the remote server 120 cannot perform any analysis on the data stored therein.

In summary, in the disclosure, the client 110 uses different keys CPS-KEY, SWS-KEY and MRWS-KEY to respectively encrypt the document pages, the second document and the MRWS, and transmits the encrypted document pages, the encrypted second document and the encrypted MRWS to the remote server 120 for storage. Since the remote server 120 does not have the keys, the remote server 120 cannot decrypt the encrypted pages, the encrypted SWS and the encrypted MRWS. Moreover, since the keys used for encrypting the document pages, the encrypted SWS and the encrypted MRWS are different, information security of the document stored in the remote server 120 is enhanced. In addition, as the client 110 extracts a part of the words of the document pages in advance to produce the encrypted SWS and the encrypted MRWS, the remote server 120 can perform corresponding processing in an encryption-domain according to various processing requirements (for example, keyword searching, etc.) of the client 110.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A document processing method, comprising:
dividing at least one document into a plurality of document pages through a client;
individually encrypting the document pages by a first key to obtain a plurality of encrypted pages through the client;
removing articles and basic grammar words from the document pages to obtain a plurality of significant words through the client;
recording the significant words and page information of the significant word through the client, wherein the page information of the significant words comprises a file name of the document and a page offset in the document;
individually encrypting the significant words and the page information by a second key different to the first key to obtain an encrypted second document through the client;
transmitting the encrypted pages and the encrypted second document from the client to a remote server for storage;
encrypting a keyword by the second key to obtain an encrypted keyword through the client when the client is to search the keyword;
transmitting the encrypted keyword from the client to the remote server;
searching the encrypted second document according to the encrypted keyword through the remote server, so as to obtain page information corresponding to the encrypted keyword;
obtaining a target encrypted page from the encrypted pages according to the page information corresponding to the encrypted keyword through the remote server;
transmitting the target encrypted page from the remote server to the client; and
decrypting the target encrypted page by the first key through the client.

2. The document processing method as claimed in claim 1, wherein the step of encrypting the document pages comprises:
   individually compressing the document pages to obtain a plurality of compressed pages; and
   encrypting the compressed pages by the first key to obtain the encrypted pages.

3. The document processing method as claimed in claim 1, further comprising:
   extracting a part of words from the significant words through the client to obtain a plurality of relevant words;
   recording the relevant words through the client to fonn a most relevant word set;
   encrypting the most relevant word set by a third key different to the first key and the second key to obtain an encrypted most relevant word set through the client; and
   transmitting the encrypted most relevant word set from the client to the remote server for storage.

4. The document processing method as claimed in claim 3, wherein the step of extracting the part of words from the significant words comprises:
   defining a commonly used word set; and
   extracting words belonged to the commonly used word set from the significant words to obtain the relevant words.

5. The document processing method as claimed in claim 3, further comprising:
   encrypting a keyword by the second key through the client to obtain a first encrypted keyword;
   encrypting the keyword by the third key through the client to obtain a second encrypted keyword;
   transmitting the first encrypted keyword and the second encrypted keyword from the client to the remote server;
   searching the encrypted second document according to the first encrypted keyword through the remote server, so as to obtain a first search result corresponding to the first encrypted keyword;
   searching the encrypted most relevant word set according to the second encrypted keyword through the remote server, so as to obtain a second search result corresponding to the second encrypted keyword;
   transmitting the first search result and the second search result from the remote server to the client; and
   comparing the first search result and the second search result through the client, wherein when the second search result is not a subset of the first search result, the remote server is confirmed to perform an unfaithful query processing.

6. The document processing method as claimed in claim 1, further comprising:
   storing the encrypted pages to a database through the remote server; and
   logging the encrypted significant words and the page information in the encrypted second document to a global search index of the remote server.

7. The document processing method as claimed in claim 6, wherein the global search index comprises a key field and a value field, the key field records the encrypted significant words, and the value field records the page information.

8. A document processing system, comprising:
   a remote server; and
   a client, connected to the remote server through a communication network, wherein the client divides at least one document into a plurality of document pages, individually encrypts the document pages by a first key to obtain a plurality of encrypted pages, removes articles and basic grammar words from the document pages to obtain a plurality of significant words, records the significant words and page information of the significant words, individually encrypts the significant words and the page information by a second key different to the first key to obtain an encrypted second document, and transmits the encrypted pages and the encrypted second document to the remote server for storage, wherein the page information of the significant words comprises a file name of the document and a page offset in the document,
   wherein when the client is to search the keyword, the clients encrypts a keyword by the second key to obtain an encrypted keyword and transmits the encrypted keyword to the server,
   wherein the remote server searches the encrypted second document according to the encrypted keyword to obtain page information corresponding to the encrypted keyword, obtains a target encrypted page from the encrypted pages according to the page information, and transmits the target encrypted page to the client, and
   wherein the client decrypts the target encrypted page by the first key.

9. The document processing system as claimed in claim 8, wherein the client individually compresses the document pages to obtain a plurality of compressed pages, and the client encrypts the compressed pages by the first key to obtain the encrypted pages.

10. The document processing system as claimed in claim 8, wherein the client extracts a part of words from the significant words to obtain a plurality of relevant words to form a most relevant word set; the client individually encrypts the most relevant word set by a third key different to the first key and the second key to obtain an encrypted most relevant word set; and the client transmits the encrypted most relevant word set to the remote server for storage.

11. The document processing system as claimed in claim 10, wherein the client defines a commonly used word set; and the client extracts words belonged to the commonly used word set from the significant words to obtain the relevant words.

12. The document processing system as claimed in claim 10, wherein the client encrypts a query keyword by the second key to obtain a first encrypted keyword; the client encrypts the query keyword by the third key to obtain a second encrypted keyword; the client transmits the first encrypted keyword and the second encrypted keyword to the remote server; the remote server searches the encrypted second document according to the first encrypted keyword to obtain a first search result corresponding to the first encrypted keyword; the remote server searches the most relevant word set according to the second encrypted keyword to obtain a second search result corresponding to the second encrypted keyword; the remote server transmits the first search result and the second search result to the client; and the client compares the first search result and the second search result, wherein when the second search result is not a subset of the first search result, the remote server is confirmed to perform an unfaithful query processing.

13. The document processing system as claimed in claim 12, wherein the document comprises a test file, the test file comprises at least one known keyword, and the query keyword comprises the known keyword.

14. The document processing system as claimed in claim 8, wherein the remote server stores the encrypted pages to a database; and the remote server logs the encrypted significant words and the page information in the encrypted second document to a global search index of the remote server.

15. The document processing system as claimed in claim 14, wherein the global search index comprises a key field and a value field, the key field records the encrypted significant words, and the value field records the page information.

16. A document processing method, comprising:
dividing at least one document into a plurality of document pages through a client;
individually encrypting the document pages by a first key to obtain a plurality of encrypted pages through the client;
removing articles and basic grammar words from the document pages to obtain a plurality of original words through the client;
stemming the original words to obtain the significant words through the client;
recording the significant words and page information of the significant word through the client, wherein the page information of the significant words comprises a file name of the document and a page offset in the document;
individually encrypting the significant words and the page information by a second key different to the first key to obtain an encrypted second document through the client;
transmitting the encrypted pages and the encrypted second document from the client to a remote server for storage;
stemming a keyword to obtain a root through the client when the client is to search the keyword;
encrypting the root by the second key through the client to obtain an encrypted keyword;
transmitting the encrypted keyword from the client to the remote server;
searching the encrypted second document according to the encrypted keyword through the remote server, so as to obtain an index information set corresponding to the encrypted keyword, wherein the index information set comprises a plurality of candidate encrypted significant words and a plurality of candidate index information;
transmitting the index information set from the remote server to the client;
decrypting the candidate encrypted significant words by the second key through the client to obtain a plurality of decrypted candidate words, so as to facilitate a user selecting a target significant word from the decrypted candidate words;
transmitting target index information corresponding to the target significant word in the candidate index information from the client to the remote server;
obtaining a target encrypted page from the encrypted pages according to the target index information through the remote server;
transmitting the target encrypted page from the remote server to the client; and
decrypting the target encrypted page by the first key through the client.

17. The document processing method as claimed in claim 16, wherein the step of transmitting the index information set from the remote server to the client comprises:
ranking the index information set according to a most frequently occurring keyword in the encrypted second document of the remote server; and
transmitting the ranked index information set to the client from the remote server.

18. A document processing system, comprising:
a remote server; and
a client, connected to the remote server through a communication network, wherein the client divides at least one document into a plurality of document pages, individually encrypts the document pages by a first key to obtain a plurality of encrypted pages, removes articles and basic grammar words from the document pages to obtain a plurality of original words, stems the original words to obtain the significant words, records the significant words and page information of the significant words, individually encrypts the significant words and the page information by a second key different to the first key to obtain an encrypted second document, and transmits the encrypted pages and the encrypted second document to the remote server for storage, wherein the page information of the significant words comprises a file name of the document and a page offset in the document,
wherein when the client is to search the keyword, the client stems a keyword to obtain a root, encrypts the root by the second key to obtain an encrypted keyword, transmits the encrypted keyword to the remote server,
wherein the remote server searches the encrypted second document according to the encrypted keyword so as to obtain an index information set corresponding to the encrypted keyword and transmits the index information set to the client, wherein the index information set comprises a plurality of candidate encrypted significant words and a plurality of candidate index information,
wherein the client decrypts the candidate encrypted significant words by the second key to obtain a plurality of decrypted candidate words so as to facilitate a user selecting a target significant word from the decrypted candidate words, and transmits target index information corresponding to the target significant word in the candidate index information to the remote server,
wherein the remote server obtains a target encrypted page from the encrypted pages according to the target index information and transmits the target encrypted page to the client, and
wherein the client decrypts the target encrypted page by the first key.

19. The document processing system as claimed in claim 18, wherein the remote server ranks the index information set according to a most frequently occurring keyword in the encrypted second document and transmits the ranked index information set to the client.

* * * * *